(12) United States Patent
Nance et al.

(10) Patent No.: US 6,439,816 B1
(45) Date of Patent: Aug. 27, 2002

(54) LUG NUT ASSEMBLY

(76) Inventors: James Noland Nance, 2620 Nance's Ferry Rd., NewMarket, TN (US) 37820; James A. Snyder, Jr., 4810 Shady Rd., Strawberry, TN (US) 37871

( * ) Notice: Subject to any disclaimer, the term of this patent is extended or adjusted under 35 U.S.C. 154(b) by 0 days.

(21) Appl. No.: 09/781,785

(22) Filed: Feb. 12, 2001

(51) Int. Cl.$^7$ .............................. F16B 21/18; F16B 37/04
(52) U.S. Cl. .................... 411/108; 411/112; 411/353; 411/432; 411/999
(58) Field of Search ................................. 411/105, 108, 411/109, 111, 112, 352, 353, 432, 965, 999

(56) References Cited

U.S. PATENT DOCUMENTS

| | | | |
|---|---|---|---|
| 2,722,725 A | * 11/1955 | Moore | 411/999 X |
| 2,737,222 A | * 3/1956 | Becker | 411/999 X |
| 3,616,828 A | * 11/1971 | Jessmore | 411/432 X |
| 3,829,163 A | * 8/1974 | Hans | 411/999 X |
| 4,863,326 A | * 9/1989 | Vickers | 411/108 X |
| 4,971,495 A | 11/1990 | Dolin | |
| 5,042,880 A | 8/1991 | Garuti et al. | |
| 5,056,974 A | 10/1991 | Dolin | |
| 5,174,702 A | 12/1992 | Dolin | |
| 5,452,944 A | 9/1995 | Bear | |
| 5,611,654 A | * 3/1997 | Frattarola et al. | 411/999 X |
| 6,039,408 A | 3/2000 | Alvarez | |
| 6,089,674 A | 7/2000 | Whitman | |

\* cited by examiner

*Primary Examiner*—Neill Wilson
(74) *Attorney, Agent, or Firm*—Pitts & Brittian, P.C.

(57) ABSTRACT

A lug nut assembly is provided for securing a wheel rim defining at least one aperture to a wheel hub including at least one threaded stud extending from the wheel hub. The lug nut assembly comprises an elongated sleeve that includes a central bore that defines a longitudinal axis. The elongated sleeve has a secured end rotatably secured to the wheel rim and an opposed distal end extending outwardly from the rim. The sleeve includes at least one wrench engaging surface. A nut, having a central threaded bore that is adapted to matingly engage the threaded stud, is slidably mounted within the sleeve to move coaxially along the longitudinal axis of the sleeve. Means are provided for preventing independent rotation of the sleeve relative to the nut.

9 Claims, 2 Drawing Sheets

LUG NUT ASSEMBLY

TECHNICAL FIELD

The present invention relates generally to apparatus for securing a wheel rim to a hub and more particularly to an assembly that permits rapid mounting and dismounting of a wheel rim to or from a wheel hub including at least one threaded stud.

BACKGROUND OF THE INVENTION

In the field of vehicles, and particularly racing vehicles, the time required to mount or dismount a wheel from a hub can be very important. With regard to racing cars, where fractions of seconds spent changing wheels can determine the outcome of a race, it is imperative that no time be wasted in the process of mounting and dismounting wheels.

Generally, a wheel hub includes at least one threaded stud that extends generally perpendicularly from the wheel rim, parallel to the ground. The wheel rim defines at least one aperture of a size adapted to slidingly receive the threaded stud. After the rim has been placed in position adjacent to the wheel hub, with the threaded stud extending through the aperture defined in the wheel rim, a lug nut is then threadably engaged with the threaded stud and rotated into contact with the wheel rim, securing the rim to the hub.

In order to eliminate any time wasted in locating and orienting lug nuts for threading onto threaded studs, various efforts have been made to ensure that the lug nuts are appropriately positioned directly over the apertures in the rim prior to mounting a wheel upon a wheel hub. Glue and other adhesives have been used to attach the lug nuts to the rim. Unfortunately, though glue and other adhesives may be very inexpensive materials, temperature, moisture conditions and even rough handling can affect the effectiveness of the attachment, allowing the lug nut to separate from the rim unintentionally. The time spent searching for a separated lug nut can be quite costly in auto racing. Moreover, when such lug nuts are removed, there is nothing securing the lug nut to the rim. They may fall to the ground where they present a safety hazard to people walking around the site or may even be thrown over considerable distances at high rates of speed by a spinning tire. In addition, even if the lug nuts are retrieved without damage, time must be spent re-adhering the lugs for the next use.

If a lug nut is cross-threaded on a stud, it is at a minimum a nuisance and a waste of time because the lug nut must be reversed and re-threaded properly. In addition, if a lug nut is forced cross-thread with a wrench, the threads on the stud and/or the nut may be damaged and require replacement.

In response to the apparent deficiencies presented by the use of adhesives, various attempts have been made to provide apparatus for attaching the lug nuts to the wheel rim, such as the apparatus disclosed in U.S. Pat. No. 5,042,880 issued to Garuti et al. on Aug. 27, 1991. Therein is disclosed a coplanar spiral spring that is attached at one end to a wheel rim and a lug nut is rotatably mounted upon the spring. The spring retains the lug nut in a position adjacent to an aperture in the wheel rim to threadably engage a threaded stud as it passes through the aperture. While a substantial improvement over the attempts using adhesives, the '880 apparatus is not a satisfactory solution to the conditions of auto racing.

The apparatus of the '880 patent is designed to hold a lug nut in position adjacent to an aperture defined in the rim in precisely the position to matingly receive the threaded stud as it passes through the aperture without cross threading. However, if in the course of the normal rough and hurried handling of racing wheels the helical spring is bent, the '880 apparatus will hold the nut in a position very likely to induce cross threading. Moreover, given the oily and dusty nature of auto racing, oil and dirt will accumulate on the threaded studs and lug nuts, thus also creating slight misalignments that can lead to cross threading.

Accordingly, one of the objects of the present invention is to provide a lug nut assembly that is secured to a wheel rim.

It is also an object of the present invention to provide a lug nut assembly that retains a lug nut in position adjacent to a wheel rim aperture in a position to matingly receive a threaded stud without cross threading.

It is a further object of the present invention to provide a lug nut assembly that protects a lug nut and threaded stud from accumulation of oil and dirt and from physical damage from raceway debris.

SUMMARY OF THE INVENTION

In accordance with the present invention a lug nut assembly is provided which retains a lug nut in an appropriate position to matingly engage a threaded stud as it passes through a wheel rim aperture without cross threading. The assembly includes an elongated sleeve that includes a central bore defining a longitudinal axis. The sleeve includes a secured end rotatably secured to the wheel rim and a distal end extending outwardly from the wheel rim. The sleeve includes at least one wrench engaging surface. A nut having a central threaded bore adapted to engage the threaded stud defines a central longitudinal axis that is coaxial with the axis of the sleeve. The nut is slidably mounted within the sleeve to move coaxially along the longitudinal axis of the sleeve. A longitudinal key that is parallel to the longitudinal axis of the sleeve prevents independent rotation of the sleeve relative to the nut. In one embodiment of the present invention a spring is located within the central bore of the sleeve to urge the nut towards the secured end of the sleeve and the distal end of the sleeve is closed with a cap to prevent entry of oil and particles into the central bore of the sleeve.

BRIEF DESCRIPTION OF THE DRAWINGS

The above mentioned features of the invention will become more clearly understood from the following detailed description of the invention read together with the claims and drawings in which:

BEST MODE FOR CARRYING OUT THE INVENTION

Figures 1, 2:
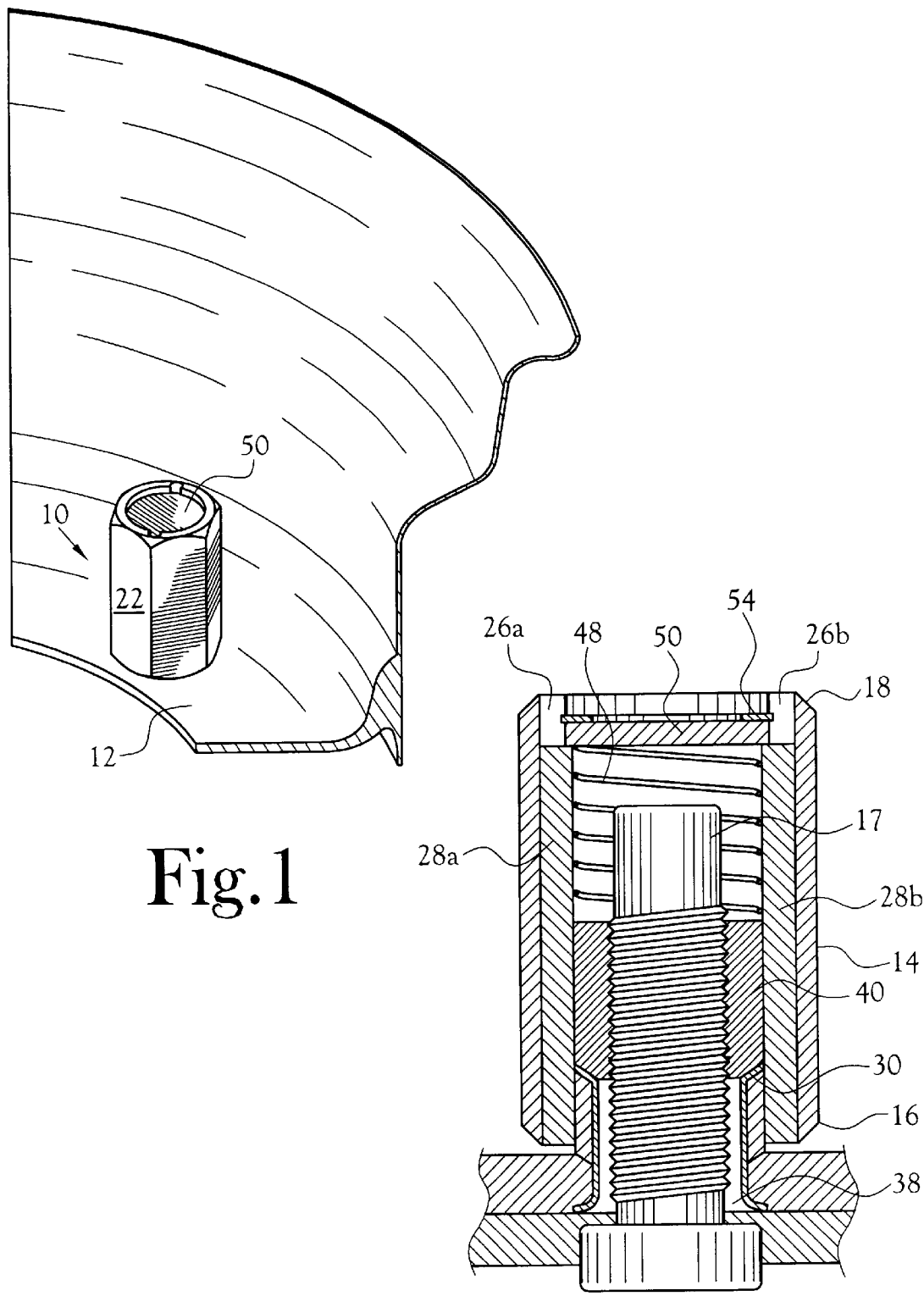
FIG. 1 is a perspective view of a lug nut assembly in accordance with the present invention.
FIG. 2 is a sectional elevation view of a lug nut assembly in accordance with the present invention.

Referring now to the Figures in which like reference numerals indicate like or corresponding features, there is shown in FIG. 1 a lug nut assembly 10 rotatably secured to a wheel rim 12 that is adapted for securing to a wheel hub 15 including at least one threaded stud 17.

The lug nut assembly 10 includes an elongated sleeve 14, which may comprise aluminum or steel, for example, having a secured end 16 and an opposed distal end 18. A generally cylindrical central bore 20 having an axis 21 is defined in the sleeve 14, extending from the secured end 16 to the distal end 18. In the depicted embodiment, the sleeve 14 is approximately two inches in length and approximately 1.25 inches in width. The outer surface of the sleeve 14 is hexagonal in cross-section to provide six wrench engaging surfaces 22 adaptable for rotation by a socket wrench well known in the industry. The secured end of the sleeve 14 is beveled to matingly engage a beveled area surrounding an aperture 23 defined in a wheel rim 12.

The inner wall 24 defining the bore 20 includes two longitudinal, diametrically opposed channels 26a and 26b that are parallel to the longitudinal axis 21 of the bore 20. Each of the channels 26a and 26b is semicircular in cross-section, comprising at least 180 degrees. Cylindrical rods 28a and 28b are mounted within the channels 26a and 26b, extending inwardly from the inner wall 14 toward the axis 21 to define longitudinal keys.

The inner wall 24 of the sleeve 14 is of a smaller diameter adjacent the secured end 16 than it is adjacent to the distal end 18, thus defining a shoulder 30 that is preferably beveled toward the secured end at an angle of about 30 degrees. An elongated inner sleeve 32 having an sleeve end 34 and a rim end 36 is rotatably mounted coaxially within the sleeve 14. The sleeve end 34 of the inner sleeve is flared at an angle of about 30 degrees so as to engage the shoulder 30 of the sleeve 14. The rim end of the inner sleeve 32 extends through an aperture 23 defined in the wheel rim 12 and is outwardly flared to allow rotation within the aperture 23, but not allow removal of the inner sleeve from the aperture 23. The sleeve end 34 of the inner sleeve 32 includes two diametrically opposed notches 37a and 37b adapted to engage the rods 28a and 28b, thus preventing rotation of the inner sleeve 32 relative to the sleeve 14.

A nut 40 including a central threaded bore 42 is slidably mounted within the bore 20 of the sleeve 14. The axis of the central threaded bore 42 is coaxial with the bore 20. Two diametrically opposed channels 44a and 44b are defined in the outer cylindrical surface of the nut 40. The channels 44a and 44b are adapted to slidingly receive a portion of the rods 28a and 28b, respectively. The nut 40 is thus slidable longitudinally within the bore 20, but is prevented from rotating relative to the sleeve 14 by the keying engagement of the rod 28a within the channels 26a and 44a and the keying engagement of the rod 28b within the channels 26b and 44b. The threads 46 of the nut 40 are adapted to matingly receive the threaded stud 17. The end of the nut adjacent to the inner sleeve 32 is beveled at an angle of about 30 degrees to provide mating engagement with the flared sleeve end 34.

Figures 3, 4:
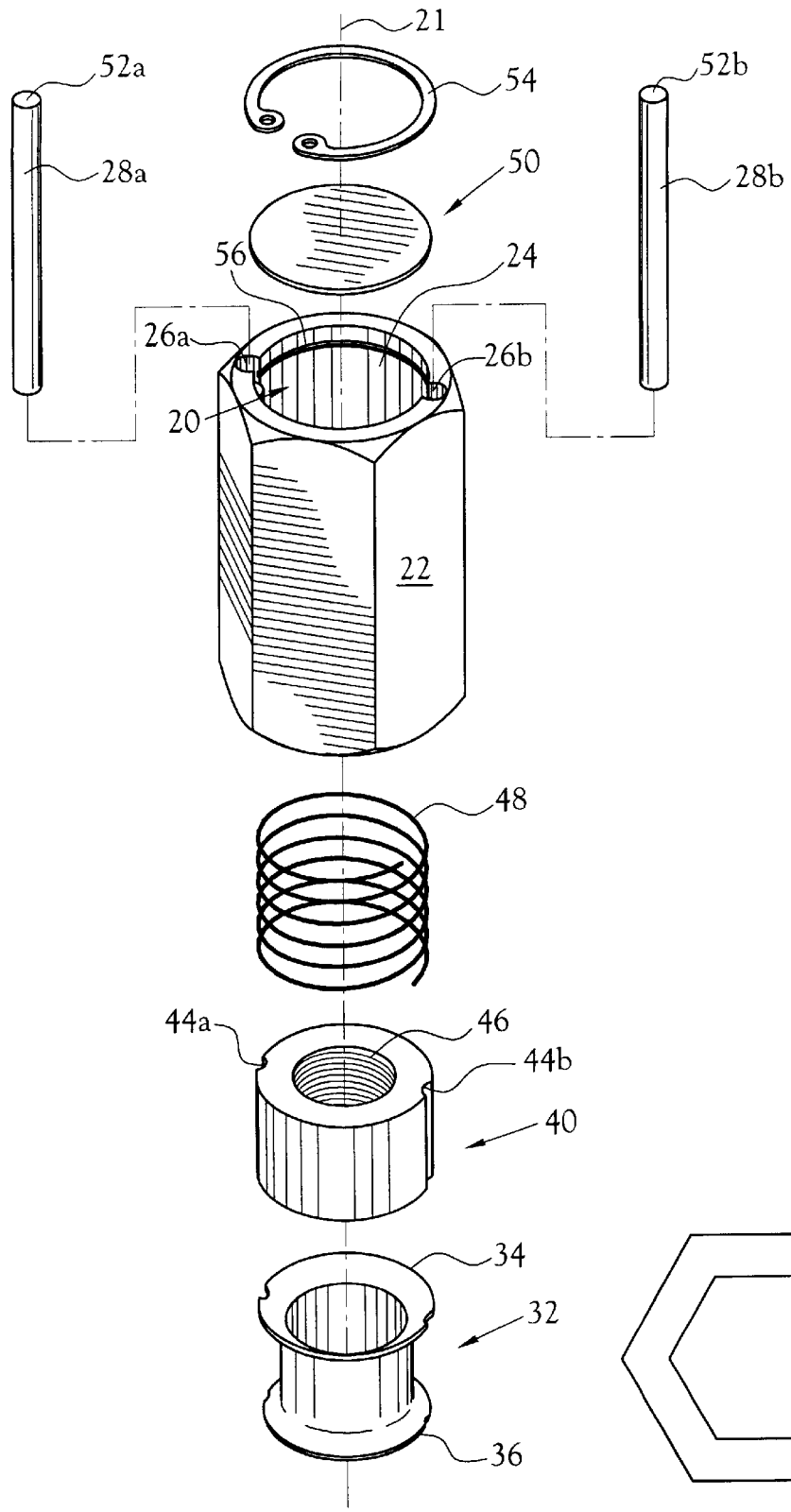
FIG. 3 is an exploded perspective view of a lug nut assembly in accordance with the present invention.
FIG. 4 is an elevation view of an alternative embodiment of a lug nut assembly in accordance with the present invention.

In an alternative embodiment that does not include rods 28a and 28b as keys, a nut 60 be formed with a non-circular cross-section, such as a hexagon, for example, as depicted in FIG. 4, provided that the bore 20 has a similar, yet larger, cross-section adapted to allow sliding axial movement by the nut 40 and to prevent independent rotation of the nut 40 relative to the sleeve 14. It will be recognized by those skilled in the art that other means may be used to prevent independent rotation of the sleeve 14 and the nut 40.

A coil spring 48 is coaxially located within the bore 20 of the sleeve 14 between the nut 40 and the distal end 18 of the sleeve 14. The diameter of the coil spring 48 is less than the diameter of the bore 20 to allow flexing of the spring within the bore 20. The coil spring 48 is retained within the bore 20 by a cover plate 50 that rests on the rods 28a and 28b. The cover plate 50 is secured in position by a c-spring 54 received in a circular channel 56 defined in the bore 20 adjacent to the distal end 18 of the sleeve 14.

In operation, at least one lug nut assembly 10 is rotatably secured to a wheel rim 12 coaxially with an aperture 23 defined in the wheel rim 12. As the rim 12 is mounted upon a wheel hub 15, a threaded stud 17 extends through the inner sleeve 32 and the nut 40 until the threaded stud engages the threads 46 of the nut 40. A socket wrench (not shown) is then applied to the sleeve 14, applying rotational torque and causing the sleeve 14 to rotate. Rotation of the sleeve 14 also rotates the nut 40 because of the keying effect of the rods 28a and 28b. As the nut 40 rotates, the mating engagement of the threads 46 and the threaded stud 17 causes the nut to slide longitudinally within the bore 20 until the nut engages the sleeve end of the inner sleeve 32. The lug nut 40 is removed from the threaded stud 17 by reversing the direction of rotation of the sleeve 14. The rotation of the sleeve 14 is imparted to the nut 40 through the rods 28a and 28b that operate as keys. The nut 40 slides within the bore 20 toward the distal end 18 until the threads 46 are disengaged from the threaded stud 17. The nut 40 remains enclosed within the sleeve 14, ready to be used again and protected from accumulation of oil and dust as well as from damage.

While a preferred embodiment has been shown and described, it will be understood that it is not intended to limit the disclosure, but rather is intended to cover all modifications and alternate methods and apparatus within the spirit and scope of the invention as defined in the appended claims.

We claim:

1. A lug nut assembly adaptable for securing a wheel rim defining at least one aperture to a wheel hub including at least one threaded stud extending from said wheel hub, said lug nut assembly comprising:

an elongated sleeve including a central bore defining a longitudinal axis, a secured end, frusto-conical in shape, rotatably secured to said rim, and a distal end extending outwardly from said rim, said sleeve including at least one wrench engaging surface, a nut having a central threaded bore adapted to matingly engage said threaded stud, said central threaded bore having a longitudinal axis coaxial with said central bore of said sleeve, said nut being slidably mounted within said sleeve to move coaxially along said longitudinal axis of said sleeve, and a longitudinal key parallel to said longitudinal axis of said sleeve to prevent independent rotation of said sleeve relative to said nut.

2. A lug nut assembly in accordance with claim 1 wherein a shoulder is defined within said central bore of said sleeve adjacent to said secured end and an aperture is defined in said rim, said sleeve being rotatably secured to said rim by an elongated inner sleeve having an expanded rim end, a central section and an expanded shoulder end, said central section of said inner sleeve being located within said aperture defined in said rim.

3. A lug nut assembly in accordance with claim 2 wherein said expanded shoulder end is frusto-conical in shape, said nut includes a securing end and a distal end, and said securing end is frusto conical in shape to matingly engage said expanded shoulder end of said inner sleeve.

4. A lug nut assembly in accordance with claim 1 wherein a spring located within said central bore of said sleeve urges said securing end of said nut into mating engagement with said expanded shoulder end of said inner sleeve.

5. A lug nut assembly adaptable for securing a wheel rim defining at least one aperture to a wheel hub including at least one threaded stud extending from said wheel hub, said lug nut assembly comprising:

an elongated sleeve including a central bore defining a longitudinal axis, a secured end, frusto-conical in shape, rotatably secured to said rim, and a distal end extending outwardly from said rim, said sleeve including at least one wrench engaging surface, a nut having a central threaded bore adapted to matingly engage said threaded stud, said central threaded bore having a longitudinal axis coaxial with said central bore of said sleeve, said nut being slidably mounted within said sleeve to move coaxially along said longitudinal axis of said sleeve, and means for preventing independent rotation of said sleeve relative to said nut.

6. A lug nut assembly in accordance with claim 5 wherein a shoulder is defined within said central bore of said sleeve adjacent to said secured end and an aperture is defined in said rim, said sleeve being rotatably secured to said rim by an elongated inner sleeve having an expanded rim end, a central section and an expanded shoulder end, said central section of said inner sleeve being located within said aperture defined in said rim.

7. A lug nut assembly in accordance with claim 6 wherein said expanded shoulder end is frusto-conical in shape, said nut includes a securing end and a distal end, and said securing end is frusto-conical in shape to matingly engage said expanded shoulder end of said inner sleeve.

8. A lug nut assembly in accordance with claim 5 wherein a spring located within said central bore of said sleeve urges said securing end of said nut into mating engagement with said expanded shoulder end of said inner sleeve.

9. A method of securing a wheel rim to a wheel hub, said wheel hub including at least one threaded stud extending from said wheel hub, comprising:

forming an elongated sleeve including a central bore defining a longitudinal axis, a secured end and a distal end, said sleeve including at least one wrench engaging surface, slidably mounting a nut within said bore of said sleeve, said nut defining a central threaded bore adapted to matingly engage said threaded stud, said central threaded bore having a longitudinal axis coaxial with said central bore of said sleeve, to move coaxially along said longitudinal axis of said sleeve, providing a longitudinal key to prevent independent rotation of said sleeve relative to said nut, and rotatably securing said secured end of said sleeve to said wheel rim adjacent to an aperture in said wheel rim adapted to slidingly receive said threaded stud, and rotating said sleeve with a wrench to matingly engage said threaded stud with said nut.

\* \* \* \* \*